(No Model.)
H. G. BRAKENSIEK.
ONION TOP CUTTER.
No. 461,491. Patented Oct. 20, 1891.
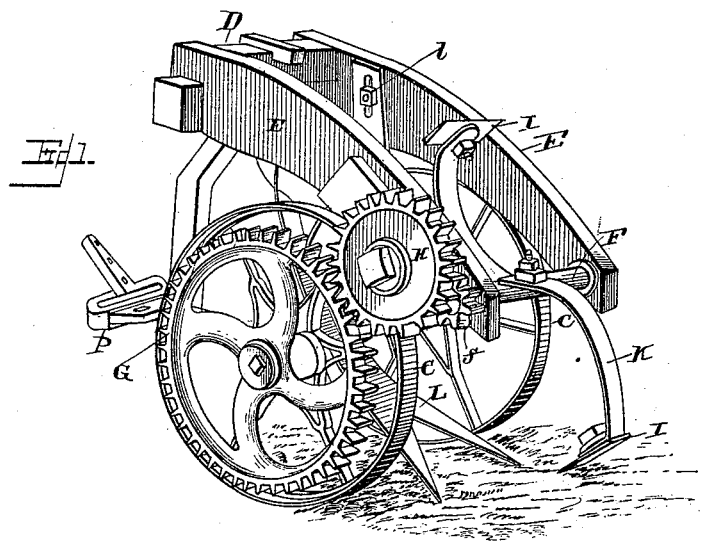
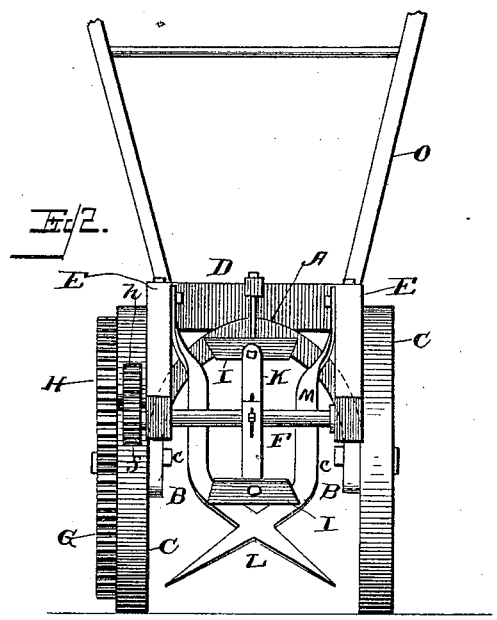
Witnesses:
J. M. Fowler Jr.
Alex. S. Stewart.
Inventor
Henry G. Brakensiek,
By Church & Church
his Attorneys.

UNITED STATES PATENT OFFICE.

HENRY G. BRAKENSIEK, OF QUINCY, ILLINOIS.

ONION-TOP CUTTER.

SPECIFICATION forming part of Letters Patent No. 461,491, dated October 20, 1891.

Application filed June 16, 1891. Serial No. 396,426. (No model.)

*To all whom it may concern:*

Be it known that I, HENRY G. BRAKENSIEK, of Quincy, in the county of Adams and State of Illinois, have invented a certain new and useful Improved Onion-Top Cutter; and I do hereby declare the following to be a full, clear, and exact description of the same, reference being had to the accompanying drawings, forming a part of this specification, and to the letters of reference marked thereon.

This invention has for its object to provide a machine for cutting off the tops of growing onions which shall be simple and easily operated; to which ends the invention consists in certain novel details of construction and combinations and arrangements of parts, to be hereinafter described, and pointed out particularly in the appended claims.

Referring to the accompanying drawings, Figure 1 is a perspective view of a machine constructed in accordance with my invention, and Fig. 2 is a front elevation of the same.

Similar letters of reference in the several figures indicate the same parts.

The letter A indicates what I term the "arch" of the machine, being an arch-shaped metallic structure adapted to straddle the row of onions being operated upon and carrying at the end on each side forwardly-projecting arms or extensions B, in the ends of which the ground-wheels C are journaled on short adjustable stud-axles c, in the well-understood manner.

To the upper part of the arch is secured the superstructure or upper framing, carrying the cutting and holding mechanism, such superstructure consisting of the cross-piece D, bolted firmly to the arch, and the forwardly-extending side pieces E, connected rigidly to the ends of the cross-piece. The side pieces E are adapted to carry the cutter-shaft F, journaled in suitable bearings therein and driven from the ground-wheel on one side through gearing preferably consisting of a large gear-wheel G, secured to the ground-wheel, a second gear H meshing therewith and carrying a third gear *h*, which meshes with the pinion *f* on the cutter-shaft. By arranging the gearing as thus described the cutter-shaft is rotated in the proper direction to cause the knives I on the ends of curved arms K to cut backward at the bottom, and in order to bring the onion-tops up into place when fallen, as well as to hold the tops in position while being cut, I provide guides L, which are in the form of a partially-open pair of shears with the points extending forward and downward. These shear-shaped guides are carried by strip-iron supports M, adjustably secured to the superstructure by bolts *m*. The inner edges of the shear-shaped guides are preferably sharpened somewhat and co-operate with the knives L to cut the onion-tops off smoothly under all circumstances, the height at which the tops shall be cut being regulated by tilting the machine or by adjusting the height of the ground-wheel.

The arms K, on the ends of which the knives are mounted, are preferably formed by curved metal strips adjustably secured to the cutter-shaft by a nut and bolt *l*, whereby they may be easily adjusted to vary the height of the cut.

The machine is preferably adapted to be pushed by hand, and for this purpose handles O are adjustably connected to the rearward extensions P, (shown clearly in Fig. 1,) from which the handles are omitted to prevent obscurity.

In operation the machine is adapted to be pushed along the rows of onions, the tops of which pass into the V-shaped opening between the guides, and the knives, being simultaneously rotated, sever them, as will be readily understood by those skilled in the art.

Having thus described my invention, what I claim as new is—

1. In an onion-top cutter, the combination, with the ground-wheel, frame, and knives driven from the ground-wheel, of the shear-shaped guides supported below the knives, substantially as described.

2. In an onion-top cutter, the combination, with the ground-wheel, frame, rotary knives, and gearing between said knives and ground-wheel, of the shear-shaped guides having their points extending forwardly and downwardly, and the supports for said guides connected to the frame, substantially as described.

3. In an onion-top cutter, the combination, with the arch having the ground-wheels journaled therein, of the superstructure carried by the arch, the cutter-shaft journaled in said superstructure, gearing between the cutter-shaft and ground-wheel, and the shear-shaped guides carried by the superstructure, substantially as described.

4. In an onion-top cutter, the combination, with the arch having the forwardly-projecting extensions, the ground-wheels journaled therein, and the handles of the superstructure mounted rigidly on the arch, of the cutter-shaft journaled in said superstructure, the pinion on said shaft, gear-wheel on one ground-wheel, the intermediate gears, and the knives mounted on the cutter-shaft, substantially as described.

5. In a machine such as described, the combination, with the ground-wheel, frame, and shear-shaped guides carried by the frame, of the cutter-shaft and the knives mounted on the ends of relatively long curved arms, whereby they are adapted to pass over the tops of the onions before severing the same, substantially as described.

HENRY G. BRAKENSIEK.

Witnesses:
L. E. EMMONS, Jr.,
L. E. EMMONS.